(12) United States Patent
Haberman

(10) Patent No.: US 12,313,424 B2
(45) Date of Patent: May 27, 2025

(54) SYSTEMS AND METHODS FOR GENERATING AND USING DYNAMIC AND LOCALIZED ROUTE-BASED ENVIRONMENTAL INFORMATION

(71) Applicant: Seth Haberman, New York, NY (US)

(72) Inventor: Seth Haberman, New York, NY (US)

(*) Notice: Subject to any disclaimer, the term of this patent is extended or adjusted under 35 U.S.C. 154(b) by 0 days.

(21) Appl. No.: 16/564,547

(22) Filed: Sep. 9, 2019

(65) Prior Publication Data

US 2019/0390975 A1      Dec. 26, 2019

Related U.S. Application Data

(63) Continuation of application No. 14/547,009, filed on Nov. 18, 2014, now Pat. No. 10,408,635.

(60) Provisional application No. 61/905,379, filed on Nov. 18, 2013.

(51) Int. Cl.
    *G01C 21/36*     (2006.01)
    *G01C 21/34*     (2006.01)

(52) U.S. Cl.
    CPC ..... *G01C 21/3694* (2013.01); *G01C 21/3415* (2013.01)

(58) Field of Classification Search
    None
    See application file for complete search history.

(56) References Cited

U.S. PATENT DOCUMENTS

| | | | | |
|---|---|---|---|---|
| 6,199,015 B1* | 3/2001 | Curtwright | ............ | G01C 21/20 701/454 |
| 6,321,158 B1* | 11/2001 | DeLorme | ............. | G06Q 10/047 701/426 |
| 6,603,405 B2* | 8/2003 | Smith | ................... | G08G 1/0962 340/602 |
| 7,471,995 B1* | 12/2008 | Robinson | ............. | G08G 5/0021 340/901 |
| 8,977,495 B1* | 3/2015 | Hurand | ............... | G01C 21/3423 701/527 |
| 9,212,921 B1* | 12/2015 | Sisbot | ............... | G08G 1/096791 |
| 2004/0236498 A1* | 11/2004 | Le | ....................... | G01C 21/3629 701/440 |
| 2006/0287818 A1* | 12/2006 | Okude | ............. | G08G 1/096822 701/423 |
| 2007/0159355 A1* | 7/2007 | Kelly | .................. | G01C 21/3694 340/995.13 |

(Continued)

*Primary Examiner* — Adam D Tissot
(74) *Attorney, Agent, or Firm* — George S. Haight

(57) ABSTRACT

Methods, systems, and computer-readable media for generating localized environmental information along a route of travel are generally described, for example, to notify users of travel conditions along a specific route and/or to generate alternative routes based on the environmental conditions. In some embodiments, an environmental information route mapping system may generate environmental maps configured to graphically display a route of travel and associated environmental conditions along the route of travel at certain travel times. In some embodiments, the environmental route maps may be configured to include alternative routes based on the environmental conditions along a route path, such as an alternative route configured to avoid an area associated with an actual or predicted hazardous or otherwise undesirable environmental condition.

14 Claims, 4 Drawing Sheets

(56) References Cited

U.S. PATENT DOCUMENTS

| | | | |
|---|---|---|---|
| 2011/0130956 A1* | 6/2011 | Tracton | G01C 21/3644 715/764 |
| 2012/0150436 A1* | 6/2012 | Rossano | G01C 21/3694 701/425 |

* cited by examiner

SYSTEMS AND METHODS FOR GENERATING AND USING DYNAMIC AND LOCALIZED ROUTE-BASED ENVIRONMENTAL INFORMATION

CROSS REFERENCE TO RELATED APPLICATIONS

This application is a continuation of U.S. patent application Ser. No. 14/547,009 filed on Nov. 18, 2014, which claims the benefit of U.S. Provisional Application No. 61/905,379 filed on Nov. 18, 2013, the contents of which are incorporated by reference in their entirety as if fully set forth herein.

FIELD OF INVENTION

The described technology generally relates to processes and technologies for generating localized environmental information along a route of travel and, more specifically, to presenting the environmental information to notify users of travel conditions along a specific route and/or to generate alternative routes based on the environmental conditions to optimize user travel conditions and efficiency.

BACKGROUND

Travelers and commuters have long sought myriad methods and devices to assist in planning their trips or commutes, including consulting weather and traffic reports. Conventional reports from a television or radio broadcast, a web page, a smart phone application, or other delivery means are typically only localized on a relatively broad potential audience. For example, a radio broadcast of current and forecasted weather conditions are typically only localized to the geographic area where the broadcast is aired. In order to attract and maintain a wide audience, such information reports must include the widest area possible within the broadcast zone. Similarly, broadcast traffic reports are only relevant to listeners traveling certain particular routes, which may only be a small percentage of the total audience. For instance, a traffic and weather report for a metropolitan area, such as New York City, typically contains a vast amount of information to which only a small portion is useful to each listener, depending on that listener's specific location. In a television broadcast, the localization and amount of information is even broader, since a television broadcast can cover significantly more area than a radio broadcast, including an entire state or multi-state region. The weather in Albany, N.Y. may not be very useful to a viewer in Lower Manhattan. In fact, a listener or viewer in Lower Manhattan must focus on the entire information report just to wean out the portion of information that is useful to him. Such a process is inefficient and time consuming to many consumers who are only looking for a very specific and localized amount of information.

Internet web sites and smartphone applications can be customized to focus only on the areas of importance to a specific user. However, a user may be traveling through multiple areas in which weather or other environmental information may differ. For example, a user traveling from Albany, N.Y. to Lower Manhattan may be able to obtain weather information for both locations, but not for the locations between these two destinations, where actual hazardous whether conditions may exist. In order for a user to gather sufficient information on the entire breadth of his journey or travels, the user must repeat the information-gathering process for each area. In addition, the user may not be able to access such information or reports while traveling. For instance, there may be safety concerns for a user to update environmental conditions using a smartphone while driving. In another instance, the user may not have access to the information during certain portions of their travel route, such as areas where wireless or telecommunication channels are unavailable for information-gathering using a smartphone application. Overall, even if the environmental information is available, such conventional processes requiring continual information-gathering is both time consuming and inefficient.

What is needed therefore, is an efficient and effective system and method to provide highly localized, customized, and dynamic weather and environmental information from multiple areas along a travel route.

SUMMARY

This disclosure is not limited to the particular systems, devices and methods described, as these may vary. The terminology used in the description is for the purpose of describing the particular versions or embodiments only, and is not intended to limit the scope.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

In an embodiment, a system configured to generate an environmental map based on at least one environmental condition may include a processor and a non-transitory, computer-readable storage medium in operable communication with the processor that contains one or more programming instructions. The one or more programming instructions, when executed, may cause the processor to access a route plan associated with route information comprising a plurality of route zones, determine a travel time for each of the plurality of route zones, determine the at least one environmental condition for each of the plurality of route zones at the travel time, and generate the environmental map for the route plan, the environmental map being configured to indicate the at least one environmental condition for each of the plurality of route zones.

In an embodiment, a computer-implemented method for generating an environmental map based on at least one environmental condition may include, by a processor, accessing a route plan associated with route information comprising a plurality of route zones, determining a travel time for each of the plurality of route zones, determining the at least one environmental condition for each of the plurality of route zones at the travel time, and generating the environmental map for the route plan, the environmental map being configured to indicate the at least one environmental condition for each of the plurality of route zones.

In an embodiment, a computer-readable storage medium having computer-readable program code configured to generate an environmental map based on at least one environmental condition may include computer-readable program code configured to access a route plan associated with route information comprising a plurality of route zones, computer-readable program code configured to determine a travel time for each of the plurality of route zones, computer-readable program code configured to determine the at least one environmental condition for each of the plurality of route zones at the travel time, and computer-readable program code configured to generate the environmental map for the route plan, the environmental map being configured to indicate the at least one environmental condition for each of the plurality of route zones.

BRIEF DESCRIPTION OF THE DRAWINGS

The above and other objects of the present invention will become more readily apparent from the following detailed description taken in connection with the accompanying drawings.

DETAILED DESCRIPTION

Figure 1:
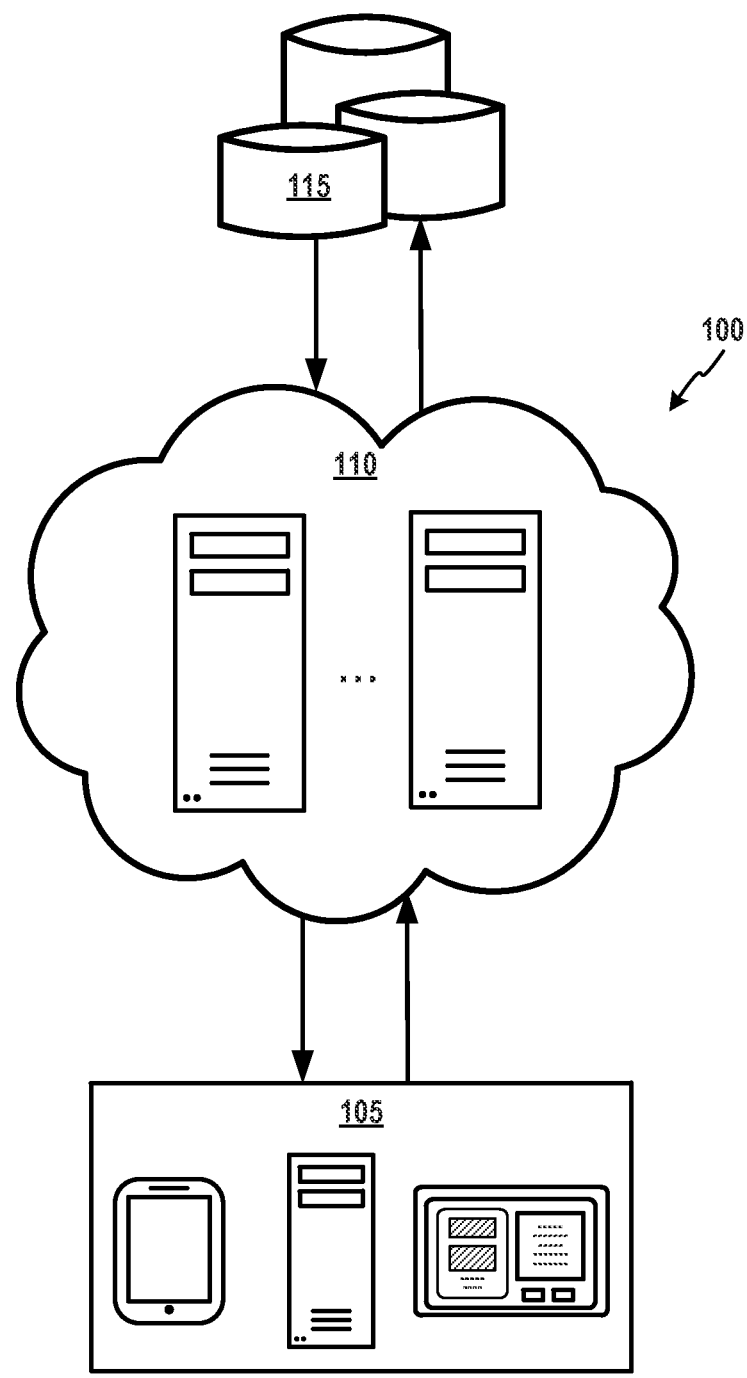
FIG. 1 depicts an illustrative environmental condition mapping system according to a some embodiments.

The described technology generally relates to systems and methods for generating localized environmental information along a route of travel and, more specifically, to presenting the environmental information to notify users of travel conditions along a specific route and/or to generate alternative routes based on the environmental condition information (or "environmental conditions"). In particular, some embodiments may provide an environmental information route mapping system (the "mapping system" or the "system") configured to generate, update, transmit, deliver, present, or otherwise make available environmental maps. In some embodiments, the environmental maps may include digital maps. In some embodiments, the environmental route maps may be configured to, among other things, indicate environmental conditions along a route path. In some embodiments, the environmental route maps may be configured to include alternative routes based on the environmental conditions along a route path. For example, an alternative route may be configured to avoid an area of a route path associated with a hazardous or otherwise undesirable environmental condition.

In some embodiments, the mapping system may be configured to receive a route or "route plan" from a user computing device for a route of travel from a first location to a second location (the "destination"). In some embodiments, the mapping system may be configured to generate a route plan based on a current location and a destination received from the user computing device, such as by entering the name of the destination and/or drawing or selection on a digital map. A route plan may include route information, such as a route, path, itinerary, course, or other type of travel directions. In some embodiments, a route plan may include and/or the mapping system may determine travel time information configured to indicate an estimated travel time for traveling the route plan. In some embodiments, the travel time information may be stored as route information associated with a route plan. In some embodiments, the route information may include a mode of transportation, such as by automobile, public transportation (e.g., bus, subway, train, trolley), taxi, bicycle, on-foot, or the like.

The mapping system may be configured to determine a plurality of zones or "route zones" for the route path In some embodiments, a user may designate one or more route zones along the route plan. In some embodiments, the route zones may be configured to segment, divide, or otherwise apportion the route plan into various areas. In some embodiments, the route zones may be configured to highlight or otherwise indicate areas along a route path. The route zones may include and/or be based on various factors, such as geographic location, landmarks, cities, states, municipalities, neighborhoods, counties, geographic formations or regions (i.e., bodies of water, mountains, desert, etc.), buildings, structures (i.e., bridges, highways, tunnels, subway systems), modes of transportation, likelihood of hazardous conditions, safety risk, legal jurisdictions, temporal information (i.e., traveling during the day or night), defined areas or dimensions (i.e., a city block, a square mile, a square kilometer, etc.), or the like. In some embodiments, the route zones may be stored as route information associated with a route plan.

In some embodiments, the mapping system may be configured to determine environmental information associated with each of the route zones. Non-limiting examples of environmental information may include current, forecasted, projected, estimated, calculated, or otherwise determined information associated with weather, traffic, crowd population, construction, public events, public transportation conditions (e.g., schedules, subway operation, indications that a public transportation routes are off-schedule, etc.), tides, currents, laws, financial information (e.g., prices, travel costs, or the like), crime rates and criminal activity, user information (e.g., health, preferences, financial information, etc.), pollutant information, or the like. In some embodiments, the mapping system may receive and/or determine zone timing information configured to indicate a time of arrival or travel through one or more of the route zones. In some embodiment, the mapping system may determine the zone timing information based on the travel time information for the route plan.

Although the examples may involve the route zones, embodiments are not so limiting as the mapping system may be configured to perform the functions described herein at the route plan and/or the route zone level.

The mapping system may generate an environmental map for a route plan based on the environmental information. In some embodiments, the environmental map may be configured to indicate an environmental condition for one or more of the route zones. In some embodiments, the mapping system may be configured to indicate an environmental condition for one or more route zones at an estimated time that the user will be within and/or proximate to a route zone based on the zone timing information. For instance, a user transmit information to the mapping system indicating that the user is traveling from point A to point B, starting at time $t_1$. The mapping system may determine a route plan having route zones 1-4. At time ti, route zone 3 may have a first weather condition (i.e., sunny and no precipitation). The mapping system may determine that the user will be traveling through route zone 3 at time $t_2$. The mapping system may determine that route zone 3 may have a second weather condition (i.e., rain and low visibility) at time time $t_2$. Accordingly, the mapping system may generate an environmental map showing the weather conditions at route zone 3 at mapping system at time $t_2$ when the user will actually be traveling through route zone 3. In some embodiments, the mapping system may be configured to dynamically change the environmental based on changes in the environmental information or travel time. For example, if slow travel conditions cause mapping system to estimate that the user may reach route zone 3 at time $t_3$, the mapping system may dynamically update the environmental map to indicate the environmental conditions at time $t_3$ instead of $t_2$. In another example, the mapping system may continuously monitor for changes in environmental conditions, such as a change in forecasted weather conditions or traffic conditions (i.e., a traffic accident or congestion), which may trigger the mapping system to update the environmental map accordingly and/or alert the user to the changed conditions.

In some embodiments, the mapping system may be configured to identify adjustment conditions that may cause the mapping system to initiate an alert (or other message) or to generate a route that avoids one or more zones subject to the adjustment condition. In general, an adjustment condition may be any condition that may cause a user to want to avoid a route zone such as inclement weather, construction, a traffic accident, or the like. In some embodiments, the mapping system may include default adjustment conditions, such as inclement weather. In some embodiments, at least a portion of the adjustment conditions may include user-selected and/or user-defined adjustment conditions, including, without limitation, tolls, highways, risk threshold (i.e., high traffic accident density areas, likelihood of ice formation on roadway, etc.), speed limits, specific areas (e.g., avoid certain neighborhoods or geographic areas, such as hills), or the like. In some embodiment, the mapping system may be configured to determine an environmental map based on the adjustment conditions. In some embodiments, the mapping system may be configured to dynamically alter an environmental map (i.e., generate an "alternative map") based on adjustment conditions.

In some embodiments, the described technology may be configured to provide and deliver a highly-localized and customized environmental information report along a defined path, route or geographic boundary. Some embodiments may include systems and methods for providing a highly-localized weather report along a defined route for a consumer including, without limitation, a localized weather report along a traveler's route. In one embodiment the system and method may use very localized and granular weather data to provide a customized weather report spanning a traveler's entire path during a given period of time.

With the advancement of satellite, radar and other environmental data collection systems, highly accurate and timely weather information can be generated for a highly-localized geographic location. For example, in many metropolitan areas, where several weather stations and other reporting equipment are located, current weather information may be a granular as a street-by-street, or block-by-block basis. To many people in these areas, knowing the weather at such a granular level provides the opportunity to plan, and execute travel to maximize the chances of avoiding any weather hindrances. For example, according to one embodiment, a commuter who lives on the North side of New York City in Manhattan, has a daily commute to Wall Street near the South end of Manhattan. The commuter travels a specific route to work every day that may include travel by public transportation, bicycle, on-foot, and/or any combination thereof. According to one embodiment, systems and methods may allow for the commuter to define a given route to the destination and generate a report containing weather and other environmental data that is highly specific and localized to that route.

The mapping system described according to some embodiments provides multiple technological advantages and technical effects on processes and techniques, including processes and techniques external to the mapping system. Conventional mapping systems and processes cannot dynamically present environmental conditions projected along a travel route in real-time or substantially real time. A non-limiting technological advantage and technical effect of the mapping system according to some embodiments is that the mapping system may allow certain devices, such as computing devices, to operate more effectively and efficiently when being used to generate a travel route in a manner that is more accurate, effective, informative, and efficient than current processes. Therefore, the mapping system according to some embodiments may operate to improve the map generation process by making the process more efficient, accurate, and cost-effective and may improve the user experience of users as they generate and use digital maps.

Although examples using weather information, are used herein, embodiments are not so limited as any type of environmental information capable of being used by the disclosed methods or systems according to some embodiments is contemplated herein.

FIG. 1 depicts an illustrative environmental condition mapping system according to a some embodiments. As shown in FIG. 1, the environmental condition mapping system (the "mapping system" or the "system") 100 may include one or more server logic devices 110, which may generally include a processor, a non-transitory memory or other storage device for housing programming instructions, data or information regarding one or more applications, and other hardware, including, for example, the central processing unit (CPU) 405, read only memory (ROM) 410, random access memory (RAM) 415, communication ports 440, controller 420, and/or memory device 425 depicted in FIG. 4 and described below in reference thereto.

In some embodiments, the programming instructions may include an environmental condition mapping application (the "mapping application" or the "application") configured to, among other things, access at least one of a route plan, a current location, a destination, environmental conditions, and/or combinations thereof. The mapping application may be configured to determine one or more route zones for the route plan and to determine at least one environmental condition for the one or more route zones. The mapping application may generate an environmental route for the route plan that is configured to indicate at least one environmental condition for each of the plurality of route zones. In some embodiments, the mapping application may be configured to determine one or more adjustment conditions associated with the one or more route zones. The mapping application may be configured to adjust an environmental map and/or to generate an environmental map having a path configured to avoid route zones associated with the adjustment conditions.

The server logic devices 110 may be in operable communication with client logic devices 105, including, but not limited to, server computing devices, personal computers (PCs), kiosk computing devices, mobile computing devices, laptop computers, smartphones, personal digital assistants (PDAs), global positioning system (GPS) devices, televisions (i.e., "smart" televisions), printing devices, tablet computing devices, in-care entertainment (ICE) systems, or any other logic and/or computing devices now known or developed in the future.

In some embodiments, the mapping application may be accessible through various platforms, such as a client application, web-based application, over the Internet, and/or a mobile application (for example, a "mobile app" or "app"). According to some embodiments, the mapping application may be configured to operate on each client logic device 105 and/or to operate on a server computing device accessible to client logic devices over a network, such as the Internet. All or some of the files, data and/or processes used for generating environmental maps and/or adjusted maps may be stored locally on each client logic device 105 and/or stored in a central location and accessible over a network (e.g., the Internet or on server logic devices 110).

In an embodiment, one or more data stores 115 may be accessible by the client logic devices 105 and/or server logic devices 110. The data stores 115 may include information use for generating route plans, environmental conditions, adjustment conditions, historical route plan and/or environmental conditions, or any other information capable of being used according to some embodiments. In some embodiments, at least a portion of the data stores 115 may include third-party information, such as third-party databases, websites, mapping engines or software, graphics engines or software, or the like. Although the one or more data stores 115 are depicted as being separate from the logic devices 105, 110, embodiments are not so limited, as all or some of the one or more data stores may be stored in one or more of the logic devices.

In some embodiments, a user may access the mapping application operating on the server logic devices 110 through a client logic device 105, such as through a mobile app operating on a smartphone. In some embodiments, a user may create a user profile, user account, or otherwise register with the mapping application. The server logic devices 110 may store information associated with the user, such as username and password information to access the mapping application and/or enhanced features thereof, payment information for fee-based functions and services, demographic information, user preferences, historical information (e.g., route paths, locations, destinations, preference choices, etc.), or the like.

The user may transmit a route plan to the mapping application. Alternatively, the user may transmit a destination and the mapping application may generate a route plan from a starting point to the destination. The starting point may be provided by the user or determined by the mapping application, such as through GPS information from the client logic device 105 or other device- or app-based location information known to those having ordinary skill in the art.

The mapping application may assign or apportion the route plan into route zones, such as by travel distance (i.e., every 20 square miles is a zone, every 50 miles along the route is a zone, etc.), geographic locations and/or boundaries, or the like. In some embodiments, certain of the route zones may be based on user selections or preferences. For instance, a user may select areas along the route path using an input device operably connected to the client logic device to specify route zones (or, alternatively, to de-select route zones), such as by tracing, selecting, or the like via the input device. In some embodiments, the mapping application may present a user with selected or potential route zones and the user may select or deselect the presented route zones (i.e., using checkboxes, by clicking on the route zones, or other selection techniques).

The mapping application may perform a search for environmental information associated with the route path, such as environmental information associated with the route path and/or each individual route zone. In some embodiments, the environmental information may include granular, highly-localized weather information. The mapping application may perform the search using various data sources, such as databases, websites, data repositories, or the like. For instance, the mapping application may access a weather information source or database providing current weather conditions and forecasted weather information. In another instance, the mapping application may access information from a traffic information service. In a further instance, the mapping application may access information from a crowd-sourcing service or social network service, such as Facebook® or twitter® to determine whether individuals, groups, or the like have provided information regarding a route zone. For example, the mapping application (or a third-party service) may determine that social network users are indicating that travel in a certain condition is hazardous due to weather conditions. In another example, the mapping application may provide a function configured to allow users to provide environmental conditions to the mapping system through, for example, a mobile app, email, simple messaging system (SMS) messages, and/or web-based interface. In a still further instance, the mapping application may access information from news sources (e.g., online news publications such as www.nytimes.com, www.reddit.com, or the like) to determine whether there is any information relating to a particular route zone. For example, an online news source may have an article stating that a certain public event, such as a demonstration, parade, or the like, may be affecting traffic in certain route zones. In yet a further instance, the mapping application may access online information for government entities, such as municipalities, departments of transportation, or the like to determine whether they have provided information relating to environmental conditions within one or more route zones. The foregoing instances are non-limiting, as the mapping application may access environmental conditions from any source capable of providing information that may be used according to some embodiments.

The mapping application may associate the environmental conditions with the route zones. In some embodiments, the mapping application may associate the environmental conditions with the route zones based on an estimated time that the user will be within or proximate to the route zone. The mapping application may generate an environmental map presenting the route path and indications of the environmental conditions associated with the route zones. The environmental map may be presented on a display device in operable communication with the client logic device 105. In some embodiments, the mapping application may continuously search, query, or otherwise monitor for changes in the environmental conditions. In this manner, the environmental map presented on the display device may be dynamically updated in real-time or substantially real-time based on changes in the environmental conditions.

In some embodiments, the generation of the environmental may by the mapping application may include presenting suggested modes of transportation, for instance, based on the environmental conditions. For example, a user may provide route information that they will be traveling on-foot through certain portions of the route path, such as within a particular route zone. The mapping application may provide suggestions, alternatives and/or configure the route using a different mode of transportation (e.g., subway, rail, taxi, automobile) based on the weather conditions. In some embodiments, the mapping application may provide suggestions, alternatives and/or configure the route to change the timing of travel through a route zone to avoid certain environmental conditions.

Figure 2:
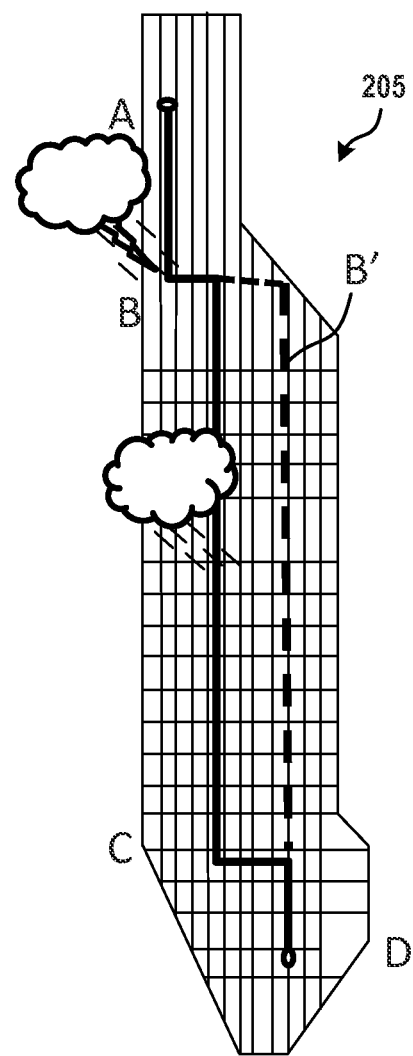
FIG. 2 depicts an illustrative environmental map according to some embodiments.

FIG. 2 depicts an illustrative environmental map according to some embodiments. As shown in FIG. 2, an environmental map 205 may include a high level diagram or map of a metropolitan area and navigational. According to one embodiment, a use may provide route information indicating a travel route from point A to point D at a start time. The path A-D may be any navigable path, including via walking, automobile, waterway, public transportation, or the like. The mapping system may generate a path from A-D according to mapping and navigation techniques provided according to some embodiments, including using mapping techniques known to those having ordinary skill in the art. For example, the system may determine the path according to an algorithm yielding the fastest route of travel according to a set of user inputs. Those inputs may include mode of transportation (i.e., walking, automobile, public transportation, subway, etc.), shortest duration, shortest distance, non-major roadways, toll avoidance, etc. For example, the user may have chosen to generate path A-D using public transportation systems of the metropolitan area. The returned path A-D may take the user, via walking to point B, a nearest subway station, where the user will take the subway to point C, followed by the user taking a bus from point C to point D, the destination. According to one embodiment, the system may correlate the defined path A-D with the current weather along the path. Advances in meteorological forecasting, the increased granularity information due to the abundance of weather stations and antennae, and faster processing speeds may allow the system to determine current weather conditions on a street-by-street, or block-by-block basis, and further establish accurate forecasts of the weather patterns for other streets and blocks in the area. The system may analyze the weather data provided through various channels according to some embodiments.

For example, the system may receive a multitude of weather reports and data submissions from several weather stations located throughout the area to determine that it is currently raining and lightning over a portion of the path A-B. The system may inform the user of such information and provide an alternate route, suggest delaying for a period of time until the weather passes, or seek confirmation to keep the same route. In the given example, the user may be walking the path A-B, so the user may opt to delay the start of travel until the provides information that the weather has passed and it is no longer raining and lightening and/or the risk thereof is below a certain threshold (e.g., below a default threshold, below a user-specified threshold, or the like, such as a percentage chance of weather occurance).

In another example, the user may specify that the mode of transportation may be via a bicycle along the entire length of the path A-D. The system, with the defined parameters input by the user, may generate the path A-D in FIG. 1 along the surface streets of the metropolitan area. The system may correlate the path A-D with received weather data and informs the user that, according to the navigational parameters input by the user (i.e., bicycle travel) and the calculated time of travel, that it will be raining over a portion of the path B-C during the estimated time the user would be traveling that segment of the overall path A-D. According to one embodiment, the system may re-calculate or adjust the path taking into account the weather information to avoid route zones B-C, generating new route A-B'-D. Based on the current and past weather conditions over the path A-B, the system calculates when the weather would be estimated to be over the new path B'-D and determines that the rider would be passed the affected area on the route by the time the inclement weather arrived over these route zones. In this manner the rider has been able to avoid inclement weather while riding a bicycle from A to D.

According to one embodiment of the invention the system may be implemented via an application of program designed for a smartphone, tablet or other mobile device. In such a device the system may take advantage of GPS, or mobile tracking features of the device to either constantly or periodically check the weather along the defined path and provide information to the user and update the route if instructed to do so by the user. For example, the user has begun traveling from A-D via bicycle, however a rain storm develops after the user has already begun the trip. Embodiments of the system recognize the impending inclement weather and alert the user of such conditions. Alternatively or in addition, the system may re-calculate or adjust an environmental map designed to avoid the inclement weather and suggest the new route to the user. The alert to the user may be in the form of an audio indication, a vibration alert, SMS message, or any other communication mechanism within the device.

According to another embodiment of the invention temporal parameters may also be used to generate, analyze, and alter navigational paths. For example, if a given route is more advantageous at certain times of the day, that route may be favored. Other parameters may include, but are not limited to, sunrise, sunset, moon phase, temperature, season, pollen, airborne pollutants, or combinations thereof.

As shown in FIG. 2, the environmental conditions may be presented as graphical representations (i.e., graphical user interface (GUI) elements) of environmental conditions, such as weather symbols. In some embodiments, the GUI elements may be selectable to present other information associated therewith. For instance, a user may select a weather-based environmental conditions to determine information about the environmental condition, such as the probability that the environmental condition will occur (e.g., 70% chance of snow), duration of the environmental condition, severity of the environmental condition, or the like.

Figure 3:
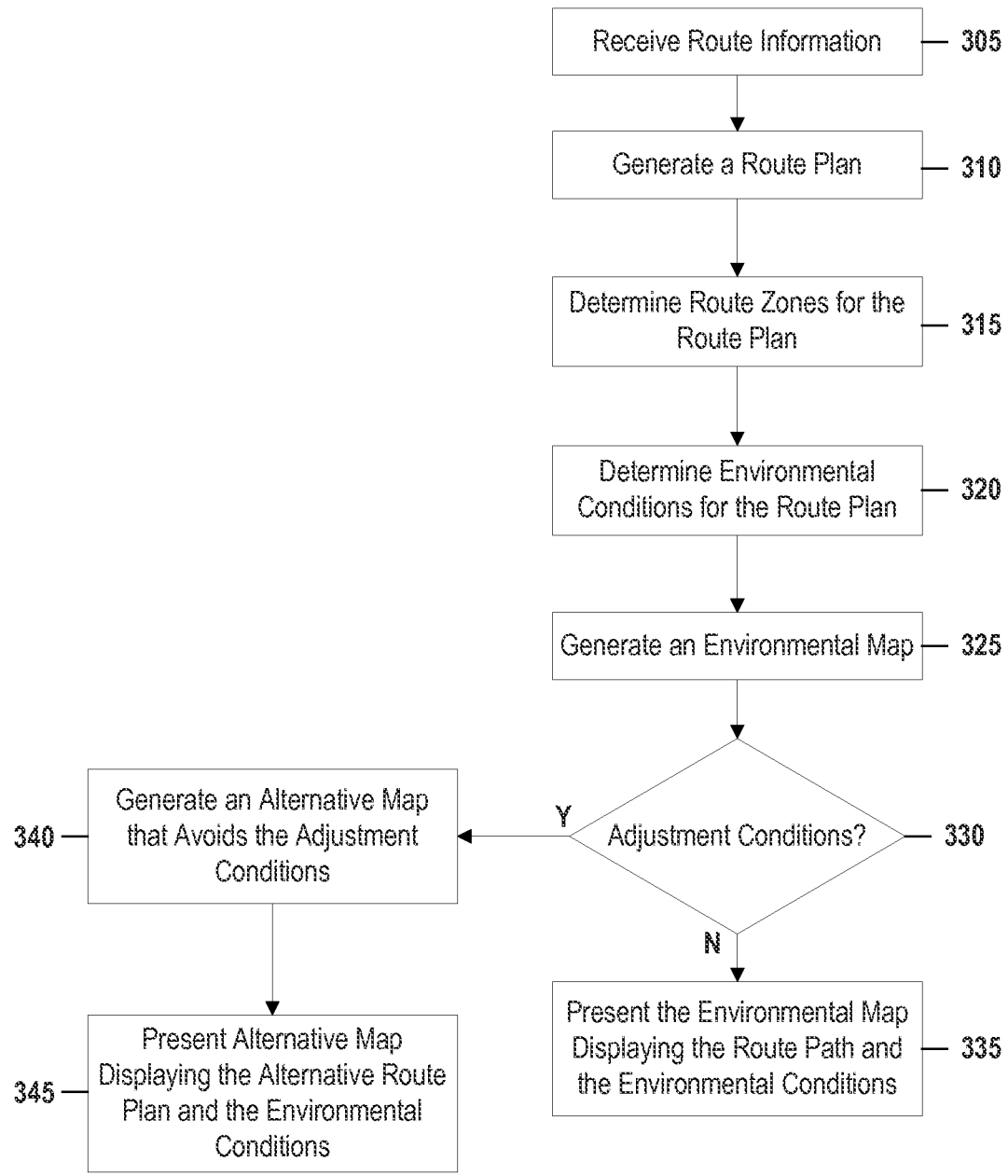
FIG. 3 depicts a flow diagram of an illustrative method for generating an environmental map according to some embodiments.

FIG. 3 depicts a flow diagram of an illustrative method for generating an environmental map that may be performed by the mapping system, such as through a server logic device (i.e., server logic device 110 of FIG. 1), arranged in accordance with at least some embodiments described herein. Example methods may include one or more operations, functions or actions as illustrated by one or more of blocks 305, 310, 315, 320, 325, 330, 335, 340, and/or 345. The operations described in blocks 305-345 may also be stored as computer-executable instructions in a computer-readable medium such the memory elements 410, 415, and 425 depicted in FIG. 4. Although illustrated as discrete blocks, various blocks may be divided into additional blocks, combined into fewer blocks, or eliminated, depending on the desired implementation.

The mapping system may receive 305 route information associated with a travel route of a user. For example, a user may transmit a destination to the mapping system using a client logic device, such as a tablet computing device. The mapping system may determine the current location of the user, such as through GPS or device information, and generate 310 a route plan from the current location to the destination. The mapping system may determine route zones 315 for the route plan, such as geographic areas or other zones. The mapping system may determine 320 environmental conditions for the route plan. For instance, the mapping system may determine localized weather conditions along the route plan. The mapping system may generate 325 an environmental map including a graphical representation of the route plan and indications of environmental conditions along the route plan, such as for each route zone. In some embodiments, the mapping application may present 335 the environmental map, displaying the route path and the environmental conditions. For example, the mapping application may transmit the environmental map to a client logic device or presentation on a display operably coupled thereto.

In some embodiments, after the mapping system may determine whether there are any adjustment conditions 330. If the mapping system does not detect any adjustment conditions 330, the mapping application may present 335 the environmental map. If the mapping system does detect adjustment conditions 330, the mapping system may generate 340 an alternative map that avoids the adjustment conditions. The mapping application may present 345 the alternative map that displays the alternative route plan and the environmental conditions.

According to some embodiments, the mapping system may provide a method of providing enhanced travel information. Based on the user input of a beginning and ending location, a map or path from between the two may be determined and generated for the user. The method may determine the current and forecasted weather for the specific locations along the defined path. If inclement or otherwise undesirable or concerning weather is occurring or will soon occur, an alternate path may be generated to avoid such weather. Alternatively, the user may override any recommendation or change to the path and continue on the originally determined path. If a new or alternative path is determined, the user may be given new or adjusted navigational instructions to the destination.

Although some embodiments are described herein with relation to commuters or travelers, one skilled in the art will recognize that the scope of the invention is not limited to only those users. For example, cross-country travel, road-trips, athletic events, and other applications in which a path is defined may be implemented without deviating from the scope of the invention.

Further, while some embodiments herein are described in the context of a smartphone or mobile device, one skilled in the art will recognize that any device capable of receiving weather information, processing said information and generating a navigation path may be used to implement embodiments of the invention.

Figure 4:
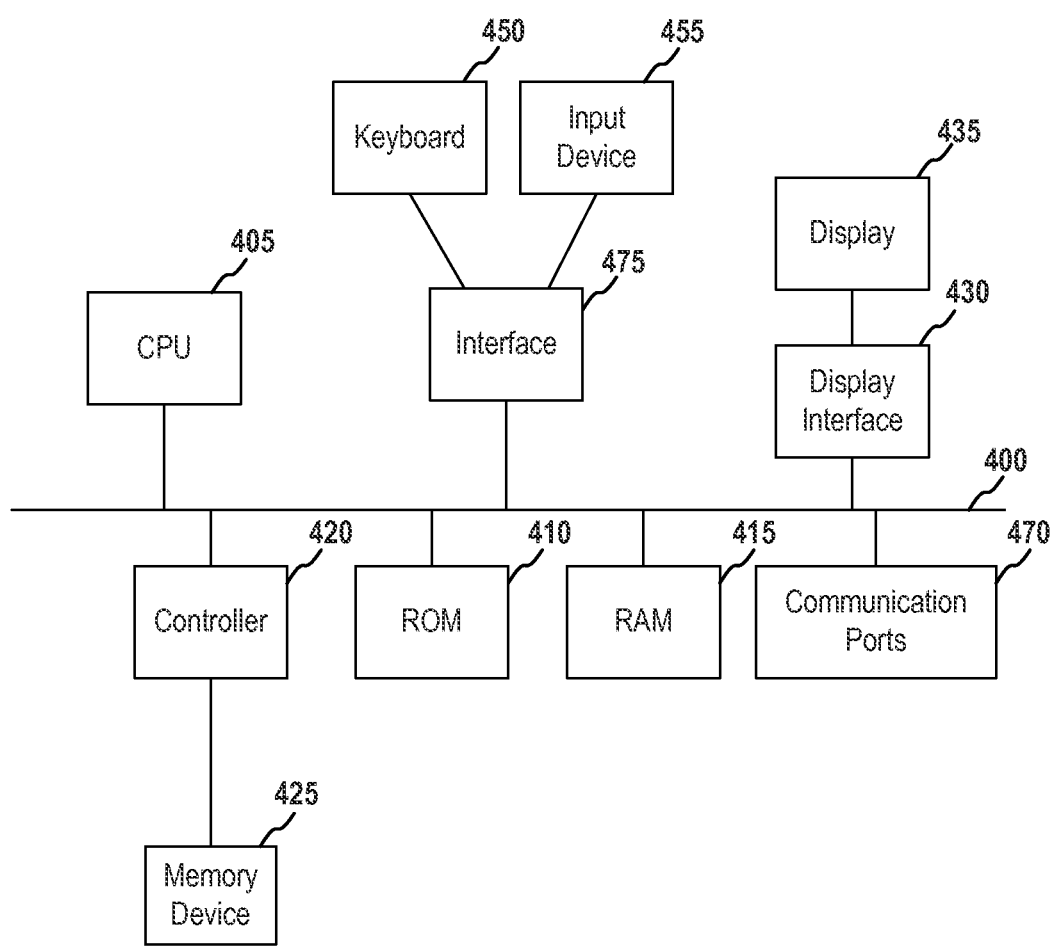
FIG. 4 illustrates various embodiments of a computing device for implementing the various methods and processes described herein.

FIG. 4 depicts a block diagram of exemplary internal hardware that may be used to contain or implement the various computer processes and systems as discussed above. A bus 400 serves as the main information highway interconnecting the other illustrated components of the hardware. CPU 405 is the central processing unit of the system, performing calculations and logic operations required to execute a program. CPU 405 is an exemplary processing device, computing device or processor as such terms are used within this disclosure. Read only memory (ROM) 430 and random access memory (RAM) 435 constitute exemplary memory devices.

A controller 420 interfaces with one or more optional memory devices 425 via the system bus 400. These memory devices 425 may include, for example, an external or internal DVD drive, a CD ROM drive, a hard drive, flash memory, a USB drive or the like. As indicated previously, these various drives and controllers are optional devices. Additionally, the memory devices 425 may be configured to include individual files for storing any software modules or instructions, auxiliary data, common files for storing groups of results or auxiliary, or one or more databases for storing the result information, auxiliary data, and related information as discussed above.

Program instructions, software or interactive modules for performing any of the functional steps associated with the determination, configuration, transmission, decoding, or the like of the presentation settings as described above may be stored in the ROM 430 and/or the RAM 435. Optionally, the program instructions may be stored on a tangible computer-readable medium such as a compact disk, a digital disk, flash memory, a memory card, a USB drive, an optical disc storage medium, such as a Blu-ray™ disc, and/or other recording medium.

An optional display interface 430 can permit information from the bus 400 to be displayed on the display 435 in audio, visual, graphic or alphanumeric format. The information may include information related to a current job ticket and associated tasks. Communication with external devices may occur using various communication ports 440. An exemplary communication port 440 may be attached to a communications network, such as the Internet or a local area network.

The hardware may also include an interface 445 which allows for receipt of data from input devices such as a keyboard 450 or other input device 455 such as a mouse, a joystick, a touch screen, a remote control, a pointing device, a video input device and/or an audio input device.

It will be appreciated that various of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art which alternatives, variations and improvements are also intended to be encompassed by the following claims.

What is claimed is:

1. A system configured to generate an environmental map based on at least one environmental condition, the system comprising:
   a processor; and
   a non-transitory, computer-readable storage medium in operable communication with the processor, wherein the computer-readable storage medium contains one or more programming instructions that, when executed, cause the processor to:
      generating a route plan associated with route information comprising a plurality of route zones,
      determine a plurality of modes of transportation available to be used for the route plan,
      determine a travel time for each of the plurality of route zones based on the plurality of modes of transportation,
      determine the at least one environmental condition for each of the plurality of route zones at the travel time,
      generate the environmental map for the route plan, the environmental map being configured to indicate the at least one environmental condition for each of the plurality of route zones;
      continuously monitor the plurality of route zones for changes in the at least one environmental condition,
      continuously update the environmental map in substantially real-time across the plurality of modes of transportation based on changes in the at least one environmental condition;

generate an alternative route to avoid at least one of the plurality of route zones in the route plan having an updated environmental condition; and recommend one or more alternative modes of transportation based on the alternative route and the updated environmental condition.

2. The system of claim 1, wherein each of the at least one environmental conditions are presented as graphical representations of environmental conditions in the environmental map.

3. The system of claim 2, wherein each of the graphical representation are selectable to present other information associated with the selected graphical representation.

4. The system of claim 1 wherein the environmental map is a granular environmental map.

5. A system configured to generate a granular environmental map based on at least one environmental condition, the system comprising:

one or more server logic devices;

one or more client logic devices in operable communication with the one or more server logic devices; and an environmental condition mapping application configured to operate on the one or more client logic devices, the application adapted to:

generate a route plan associated with route information comprising a plurality of route zones, determine a plurality of modes of transportation available to be used for the route plan, determine a travel time for each of the plurality of route zones based on the plurality of modes of transportation, determine the at least one environmental condition for each of the plurality of route zones at the travel time, continuously monitor the plurality of route zones for changes in the at least one environmental condition, continuously update the granular environmental map in substantially real-time across the plurality of modes of transportation based on changes in the at least one environmental condition, generate the environmental map for the route plan, the environmental map being configured to indicate the at least one environmental condition for each of the plurality of route zones;

generate an alternative route to avoid at least one of the plurality of route zones in the route plan having an updated environmental condition; and recommend one or more alternative modes of transportation based on the alternative route and the updated environmental condition.

6. The system of claim 5, wherein the mapping application is accessible through a client application, a web-based application, over the Internet, and a mobile application.

7. The system of claim 5, wherein the one or more server logic devices are adapted to store information associated with a user.

8. The system of claim 5, further comprising one or more data stores accessible by the one or more client logic devices and the one or more server logic devices.

9. The system of claim 7, wherein the one or more data stores include information used for generating route plans, environmental conditions, adjustment conditions, historical route plan and/or environmental conditions.

10. The system of claim 8, wherein the one or more data stores include third-party databases, websites, mapping engines or software, graphics engines or software.

11. A method to generate an environmental map based on at least one environmental condition, the method comprising, by a processor:

generating a route plan associated with route information comprising a plurality of route zones, determine a plurality of modes of transportation to be used for the route plan, determining a travel time for each of the plurality of route zones based on the plurality of modes of transportation, determining the at least one environmental condition for each of the plurality of route zones at the travel time, generating the environmental map for the route plan, the environmental map being configured to indicate the at least one environmental condition for each of the plurality of route zones;

continuously monitoring the plurality of route zones for changes in the at least one environmental condition, continuously updating the plurality of route zones of the environmental map in substantially real-time across the plurality of modes of transportation based on changes in the at least one environmental condition;

generating an alternative route to avoid at least one of the plurality of route zones in the route plan having an updated environmental condition, and recommending one or more alternative modes of transportation based on the alternative route and the updated environmental condition.

12. The method of claim 11 further comprising presenting each of the at least one environmental conditions as graphical representations of environmental conditions in the environmental map.

13. The method of claim 12, wherein each of the graphical representations are selectable to present other information associated with the selected graphical representation.

14. The system of claim 11 wherein the environmental map is a granular environmental map.

* * * * *